United States Patent
Sato et al.

(10) Patent No.: US 7,339,577 B2
(45) Date of Patent: Mar. 4, 2008

(54) INPUT DEVICE CAPABLE OF BUTTON INPUT AND COORDINATE INPUT ON THE SAME OPERATING SURFACE

(75) Inventors: Tadamitsu Sato, Fukushima-ken (JP); Akihisa Itoh, Fukushima-ken (JP); Hiroshi Shigetaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 272 days.

(21) Appl. No.: 10/157,335

(22) Filed: May 28, 2002

(65) Prior Publication Data

US 2002/0180707 A1    Dec. 5, 2002

(30) Foreign Application Priority Data

May 29, 2001 (JP) .............................. 2001-160945

(51) Int. Cl.
*G09G 5/00* (2006.01)
*G09G 5/08* (2006.01)
*G06F 3/041* (2006.01)

(52) U.S. Cl. ................... 345/173; 348/157; 178/18.01

(58) Field of Classification Search ............... 345/173, 345/174, 179, 168, 157; 178/18.01
See application file for complete search history.

(56) References Cited

U.S. PATENT DOCUMENTS

| | | | | |
|---|---|---|---|---|
| 5,311,207 A | * | 5/1994 | Kusumoto et al. | ........... 345/601 |
| 5,543,589 A | * | 8/1996 | Buchana et al. | ......... 178/18.03 |
| 5,670,755 A | * | 9/1997 | Kwon | ..................... 178/18.05 |
| 5,734,377 A | * | 3/1998 | Fukuzaki | ..................... 345/173 |
| 5,777,605 A | * | 7/1998 | Yoshinobu et al. | ......... 345/173 |
| 5,790,105 A | * | 8/1998 | Yoshikawa | .................. 345/173 |
| 5,796,406 A | * | 8/1998 | Shigematsu et al. | ........ 345/863 |
| 5,969,712 A | * | 10/1999 | Morita et al. | ............... 345/179 |
| 6,018,336 A | * | 1/2000 | Akiyama et al. | ........... 345/173 |
| 6,028,594 A | | 2/2000 | Inoue | |
| 6,029,214 A | * | 2/2000 | Dorfman et al. | .............. 710/73 |
| 6,034,672 A | * | 3/2000 | Gaultier et al. | ............. 345/173 |
| 6,118,435 A | * | 9/2000 | Fujita et al. | ................. 345/173 |
| 6,128,007 A | * | 10/2000 | Seybold | ...................... 345/179 |
| 6,191,777 B1 | * | 2/2001 | Yasuhara et al. | ........... 345/173 |

(Continued)

FOREIGN PATENT DOCUMENTS

EP       1 179 767       2/2002

(Continued)

*Primary Examiner*—Ryan Yang
(74) *Attorney, Agent, or Firm*—Brinks Hofer Gilson & Lione (57) ABSTRACT

An input device including a main device composed of a coordinate input device, an operating surface having input portions displayed thereon, and a switch device having switches connected in parallel, and a control device which selects one of a first mode in which an item signal is generated in accordance with an indication item at an input portion when the input portion is operated, and a second mode in which a position signal corresponding to an operating position on the operating surface is generated independently of the indication item at the input portion. The item signal is generated on the basis of an absolute coordinate signal output from the coordinate input device and a switch signal output from the switch device in the first mode, and the position signal is generated on the basis of a relative coordinate signal output from the coordinate input device in the second mode.

7 Claims, 9 Drawing Sheets

U.S. PATENT DOCUMENTS

| | | | |
|---|---|---|---|
| 6,208,329 B1 * | 3/2001 | Ballare | 345/173 |
| 6,243,080 B1 * | 6/2001 | Molne | 345/173 |
| 6,246,393 B1 * | 6/2001 | Watanabe et al. | 345/173 |
| 6,288,707 B1 * | 9/2001 | Philipp | 345/168 |
| 6,518,958 B1 * | 2/2003 | Miyajima et al. | 345/173 |
| 6,552,719 B2 * | 4/2003 | Lui et al. | 345/179 |
| 6,674,425 B1 * | 1/2004 | Louis et al. | 345/173 |
| 6,704,005 B2 * | 3/2004 | Kato et al. | 345/173 |

FOREIGN PATENT DOCUMENTS

| | | |
|---|---|---|
| EP | 1 197 835 | 4/2002 |
| WO | WO 98 08241 | 2/2002 |

* cited by examiner

INPUT DEVICE CAPABLE OF BUTTON INPUT AND COORDINATE INPUT ON THE SAME OPERATING SURFACE

BACKGROUND OF THE INVENTION

1. Field of the Invention

The present invention relates to an input device having a button input and a coordinate input disposed on the same operating surface.

2. Description of the Related Art

Input devices in portable telephones and similar devices include pushbutton inputs or the like for performing various operations such as inputting telephone numbers, initiating a telephone call, and terminating a telephone call.

In recent years, the number of internet connections using portable telephones has increased. In addition, the number and type of services provided via portable telephones has similarly increased. Consequently, various menu items are often displayed on the display panel or device of these portable telephones. However, selecting the menu items from the display device can be difficult and cumbersome.

In some types of portable telephones, a press-type or stick-type input mechanism for indicating directions is placed separately from the pushbutton inputs for the purpose of moving a pointer to select menu items on the display.

However, since the pushbutton input operation and the menu-selecting operation are performed using different motions and physical operations, usability of the input device can be decreased. Moreover, since the direction in which the selection position of the menu-selecting operation can be moved is limited to upward, downward, rightward, and leftward directions, quick selection of menu items can be difficult.

SUMMARY OF THE INVENTION

The present invention has been made in view of the above circumstances, and it is an object of the invention to provide an input device in which an operation of pressing a predetermined input portion, and a cursor-moving operation for menu selection or the like, can be performed without decreasing usability of the input device.

In order to achieve the above object, and according to one aspect of the present invention, there is provided a main device including a a coordinate input device having a coordinate input section, an operating surface disposed on the side of the coordinate input section and having a plurality of input portions displayed thereon, and a switch device having a plurality of switches connected in parallel and arranged on a switch surface. The coordinate input section, the operating surface, and the switch device are disposed in a stacked arrangement with the positions of the switches corresponding to the positions of the input portions. The input device also includes a control device which selects one of a first mode in which an item signal is generated in accordance with an indication item at an input portion when the input portion is operated, and a second mode in which a position signal corresponding to an operating position on the operating surface is generated independently of an indication item at the input portion, on the basis of signals from the coordinate input device and the switch device. The item signal is generated on the basis of an absolute coordinate signal output from the coordinate input device and a switch signal output from the switch device in the first mode, and the position signal is generated on the basis of a relative coordinate signal output from the coordinate input device in the second mode.

The absolute coordinate is a coordinate defined as the distance from the origin (reference position), and the relative coordinate is a coordinate defined as the distance relative to the initial point.

In the input device, a coordinate signal is generated by the coordinate input device, a switch signal is generated by the switch device, and an item signal corresponding to the input portion on the operating surface or a position signal corresponding to the operating position on the operating surface is generated on the basis of a combination of the coordinate signal and the switch signal. Consequently, it is possible to operate the input portion and input coordinate data independently of the input portion on the same operating surface, and thereby enhance the usability of the input device.

Moreover, since the plurality of switches of the switch device are connected in parallel, the wiring structure of the switch device can be simplified.

Preferably, all the switches of the switch device generate an equivalent switch signal. In this case, all of the switches of the switch device generate an equivalent switch signal, and the switch signal is input to the control device. Therefore, the configuration of the control device can be made less complicated than in conventional devices in which the switches generate different switch signals. Further, regardless of whether the number of the switches increases or decreases, there is no need to change the configuration of the control device, and the versatility of the control device can consequently be increased.

Preferably, the relative coordinate signal is generated when the coordinate input section detects the position of an operated input portion of the input portions, and the switch signal is generated when a switch corresponding to the input portion is operated by the force of pressing the input portion in the first mode. In this case, since the absolute coordinate signal in the first mode is generated corresponding to the input portion, and the switch signal is generated by the force of pressing the input portion, the switch device is not actuated simply by touching the input portion. Instead, the input portion must be pressed firmly, which prevents input error.

Preferably, the relative coordinate signal is generated in the second mode when the coordinate input section detects the operating position on the operating surface. In this case, the relative coordinate signal can be generated simply by touching the operating surface. This enhances usability and prevents errors in the operation of the device.

Further objects, features and advantages of the present invention will become apparent from the following description of the preferred embodiments with reference to the attached drawings.

DESCRIPTION OF THE PREFERRED EMBODIMENTS

An embodiment of the present invention will be described below with reference to the attached drawings.

Figure 1:
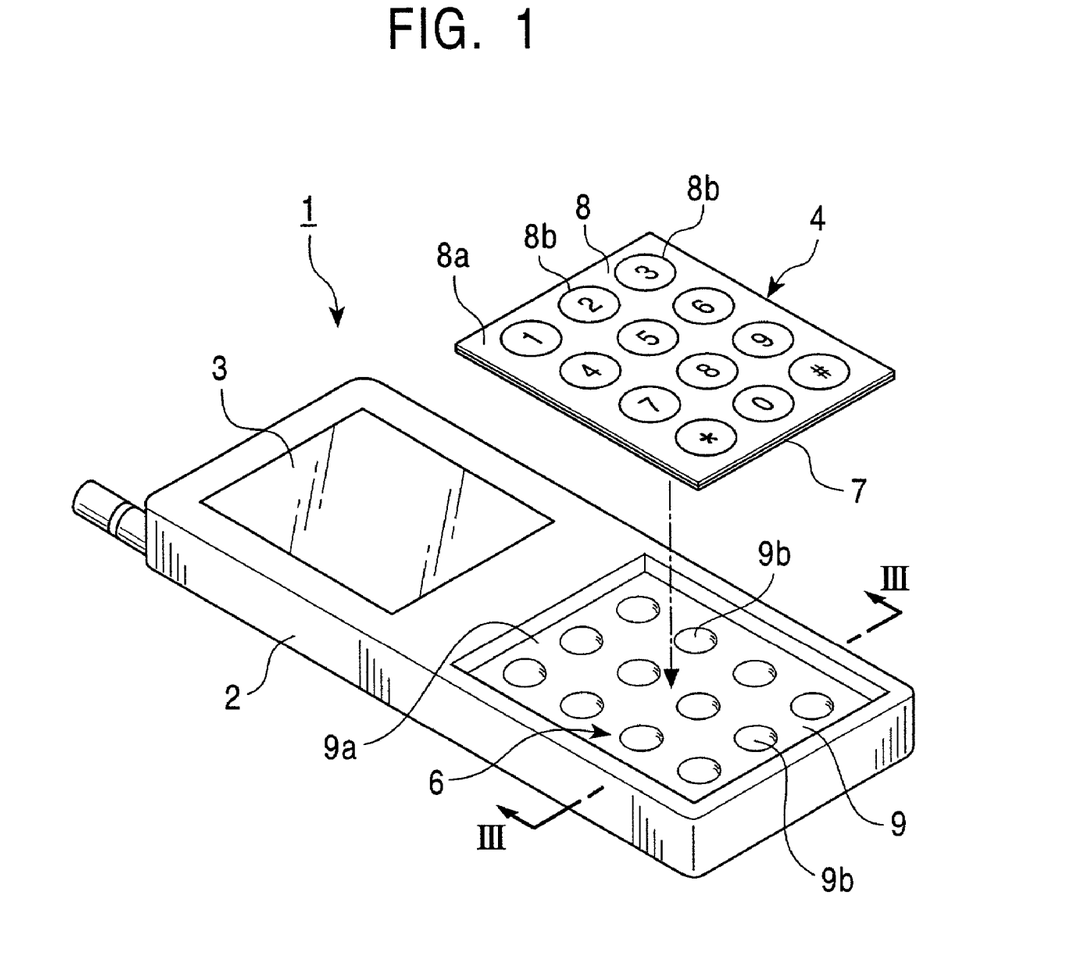
FIG. 1 is an exploded perspective view of a portable telephone having an input device according to an embodiment of the present invention.
Figure 2:
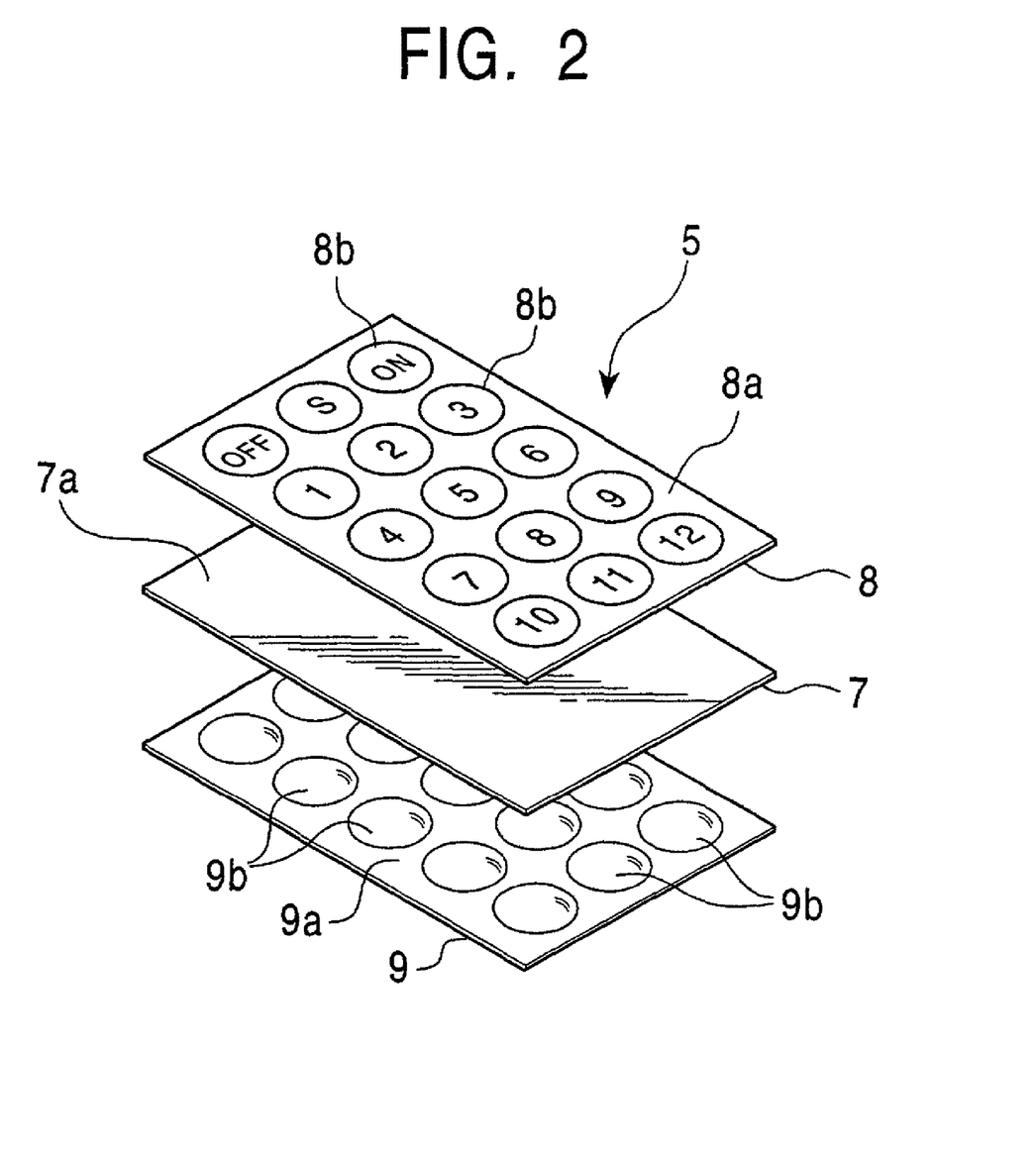
FIG. 2 is an exploded perspective view showing a principal part of the input device shown in FIG. 1.
Figure 3:
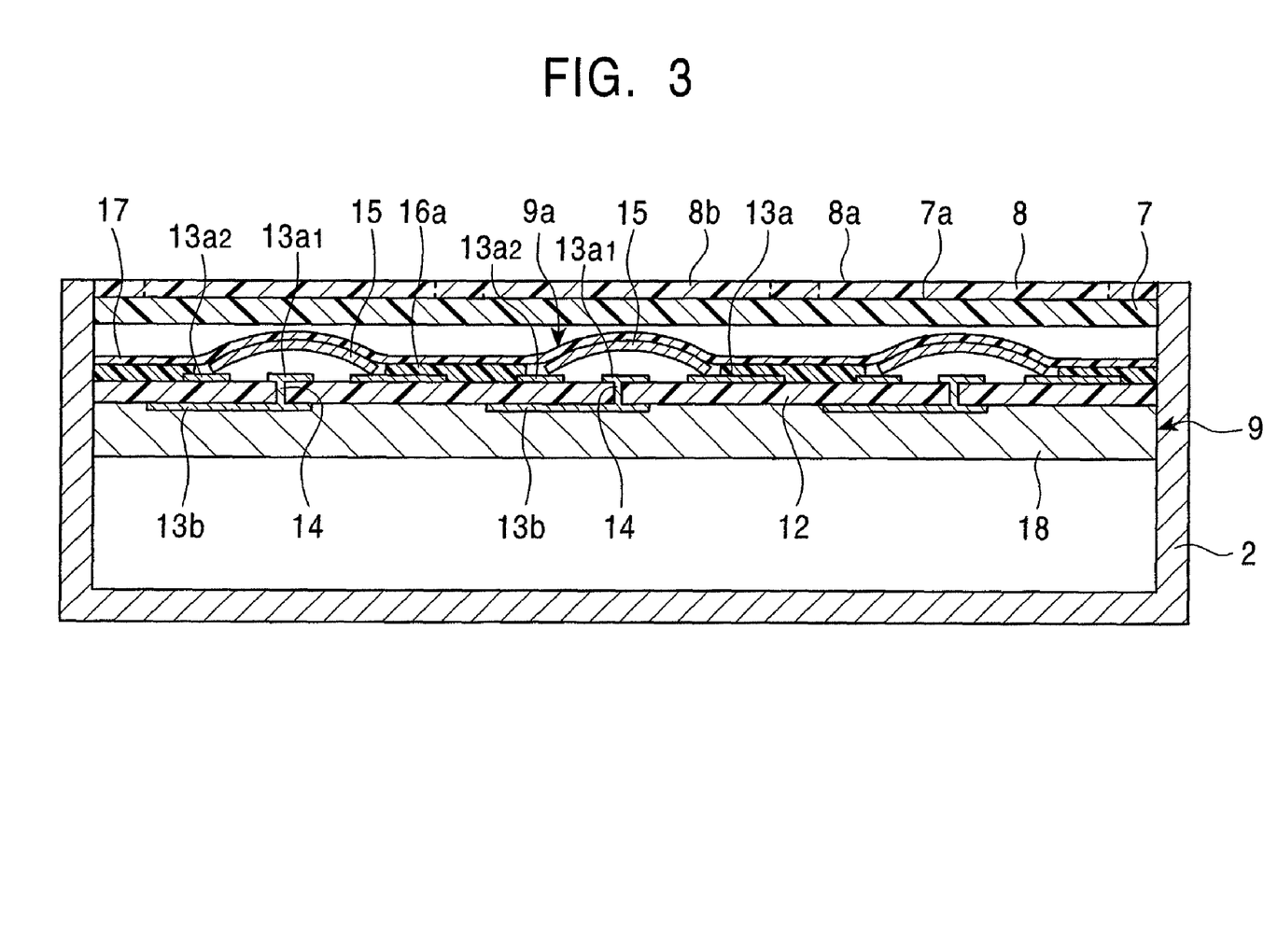
FIG. 3 is a sectional view taken along line III-III in FIG. 1 depicting the condition of the portable telephone prior to operation.
Figure 4:
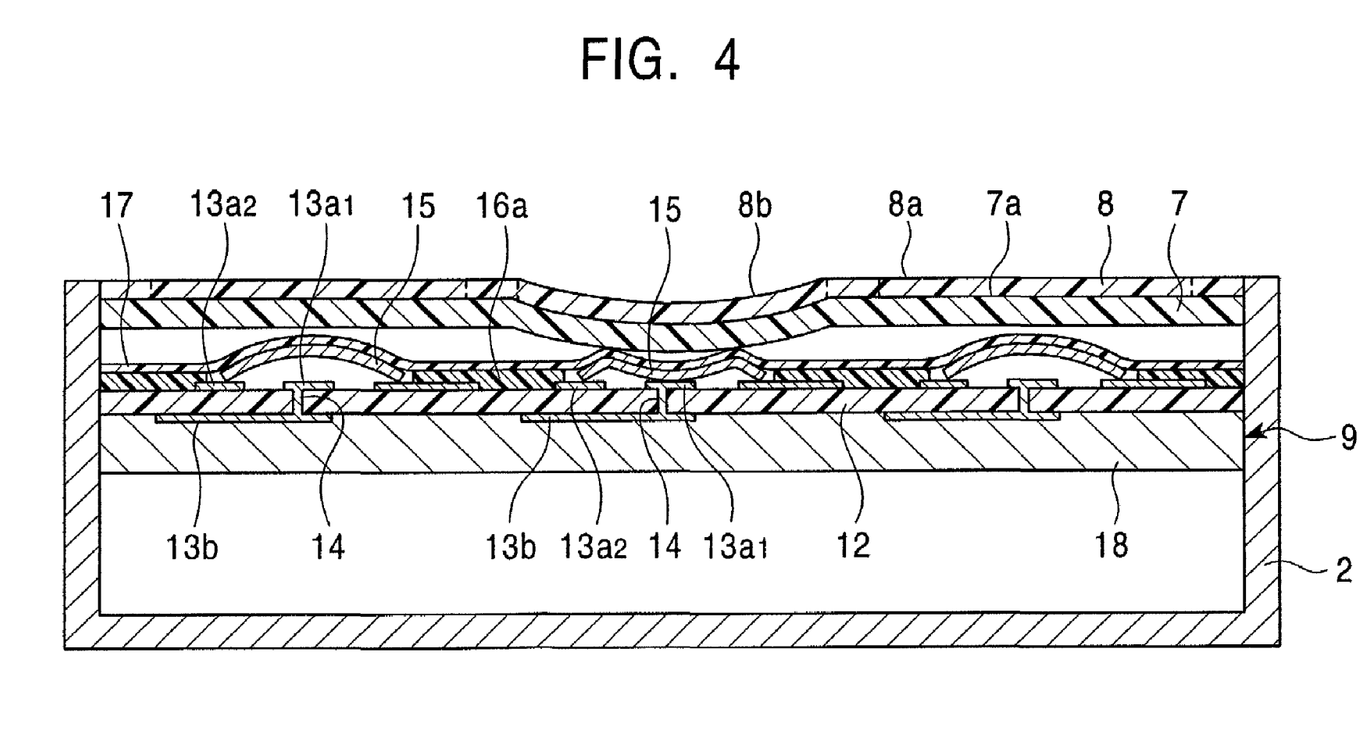
FIG. 4 is a sectional view of the portable telephone as shown in FIG. 3 depicting the condition of the portable telephone during operation.
Figure 5:
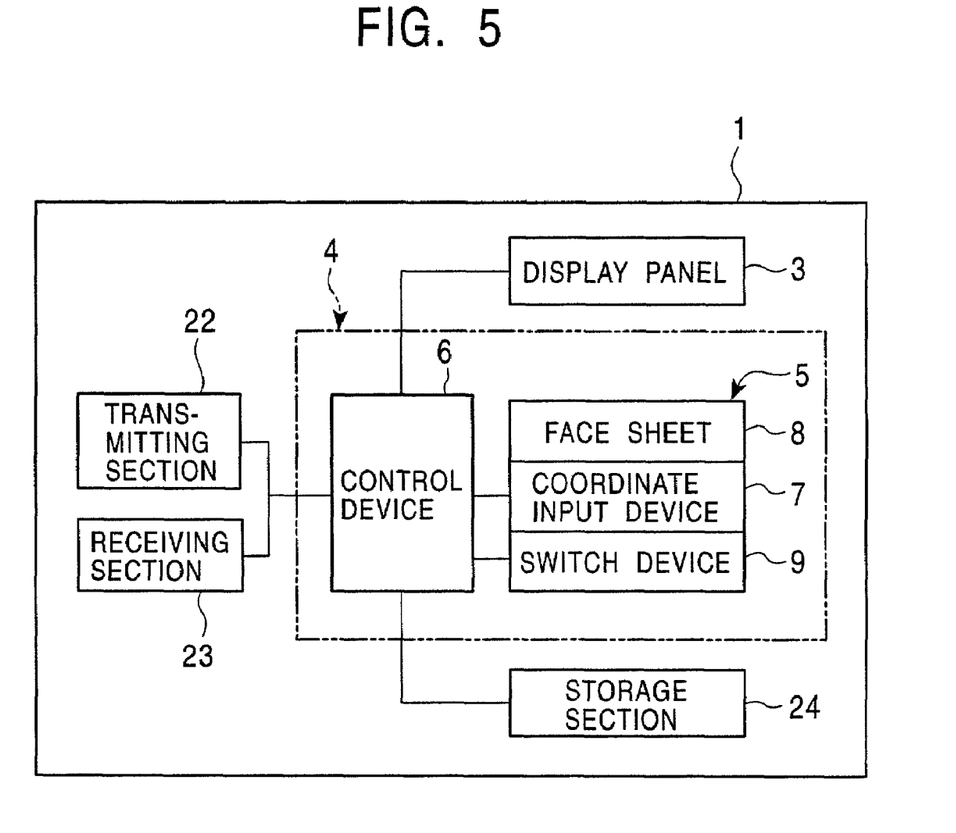
FIG. 5 is a functional block diagram of an embodiment of a portable telephone according to the present invention.

FIG. 1 is an exploded perspective view of a portable telephone having an input device according to an embodiment of the present invention, FIG. 2 is an exploded perspective view showing the principal part of the input device, FIGS. 3 and 4 are sectional views of the portable telephone taken along line III-III in FIG. 1 depicting the condition of the device before and during its operation, respectively, and FIG. 5 is a functional block diagram of the portable telephone.

Referring to FIG. 1, a portable telephone 1 generally comprises a main casing 2, a display panel 3 built in the main casing 2, and an input device 4 according to the present invention.

The display panel 3 is, for example, a monochrome or color liquid crystal panel or EL panel.

The input device 4 of this embodiment comprises a main device 5 and a control device 6, as shown schematically in FIG. 5.

In the main device 5 (see FIG. 2), a coordinate input device 7 having a coordinate input section 7a, a face sheet 8 having an operating surface 8a, and a switch device 9 are stacked as shown in FIGS. 1 to 5.

The coordinate input device 7 may be of a capacitive type design or of a pressure-sensitive type design. In a capacitive coordinate input device, X-direction electrodes and Y-direction electrodes made of Ag (silver) paste are arranged in a matrix opposed to each other on the upper and lower surfaces of an insulating resin sheet having a predetermined conductivity. The resin sheet is placed on a substrate having a conductive pattern so that the upper surface serves as a coordinate input section. The coordinate input device is bendable so that a part of the coordinate input section bends when pressure is applied thereto. Accordingly, a coordinate signal can be output by touching the surface of the coordinate input section with a dielectric substance such as a finger, pen or pointing device.

A pressure-sensitive coordinate input device includes resistors having a potential difference between the X-direction and Y-direction, and conductors opposing the resistors. When the coordinate input device is pressed by a finger or the like, a resistor and a conductor are brought into contact with each other to change the resistance, thereby allowing input of the coordinate.

As shown in FIG. 2, the resin face sheet 8 is made of PET or similar material. The resin face sheet 8 is placed on the coordinate input section 7a of the coordinate input device 7, and the upper surface thereof serves as the operating surface 8a. A plurality of input portions 8b that include signs such as "OFF" and "ON", numerals such as "1" and "2", and letters such as "A" and "B", are printed on the operating surface 8a. Circles which enclose the signs or numerals are also formed on the operating surface 8a.

The switch device 9 is placed under the coordinate input device 7. A plurality of switches 9b are arranged on a switch surface 9a of the switch device 9, and are connected in parallel.

The face sheet 8, the coordinate input device 7, and the switch device 9 are stacked with respect to each other so that the switches 9b are aligned with the respective input portions 8b printed on the operating surface 8a.

As shown in FIG. 3, the switches 9a of the switch device 9 are formed by patterning electrodes 13a made of Ag paste and serving as conductors, and a conductive pattern 13b, on both surfaces of a resin sheet 12 made of PET by printing or by other methods.

Each of the electrodes 13a is formed on the upper surface of the resin sheet 12, and includes a circular electrode 13a1 disposed at the center and a ring-shaped electrode 13a2 formed around the electrode 13a1 at a predetermined distance therefrom. A conductive pattern is connected to a part of the electrode 13a2. The conductive pattern 13b is formed on the lower surface of the resin sheet 12, and is connected to the electrode 13a1. That is, a through hole is formed in the resin sheet 12 under the electrode 13a1, and a connecting conductor 14 is disposed in the through hole so as to electrically connect the conductive pattern 13b with the electrode 13a1. A dome-shaped (diaphragm-shaped) inversion plate 15 is formed on the electrode 13a2 and is configured so that its peripheral portion is in contact with the electrode 13a2 and its vertex is aligned with the electrode 13a1.

A resist film 16a is formed around the inversion plate 15. A resist film (not shown) is also formed on the lower side of the conductive pattern 13b. The entire upper surface of the switch 9a is laminated with a resin sheet 17 made of PET. A base 18 of resin or metal is placed under the conductive pattern 13b. The switch 9a of this embodiment is consequently formed by the aforementioned construction.

Prior to its operation, the coordinate input device 7 and the face sheet 8 are not deformed, and the inversion plate 15 therefore maintains its dome-like shape like as shown in FIG. 3. When a desired input portion 8b is pressed from above by a finger, a pen, or the like, the coordinate input device 7 and the face sheet 8 are deformed or bent into a depressed state as shown in FIG. 4. The inversion plate 15 is likewise pressed by the pressing force, and is inverted so as to come into contact with the electrode 13a1. As a result, the electrode 13a and the conductive pattern 13b are electrically connected and the switch output is turned on.

As shown schematically in FIG. 5, the input device 4 of the portable telephone 1 also includes the control device 6. The display panel 3, the coordinate input device 7, and the switch device 9 described above are connected to the control device 6 A transmitting section 22, a receiving section 23, and a storage section 24 are also connected to the control device 6. The transmitting section 22 and the receiving section 23 exchange audio signals and data signals with the outside (i.e., from outside of the telephone 1), and the storage section 24 stores telephone number data, various setting data, display data to be displayed on the display panel 3 and the like.

Figure 6:
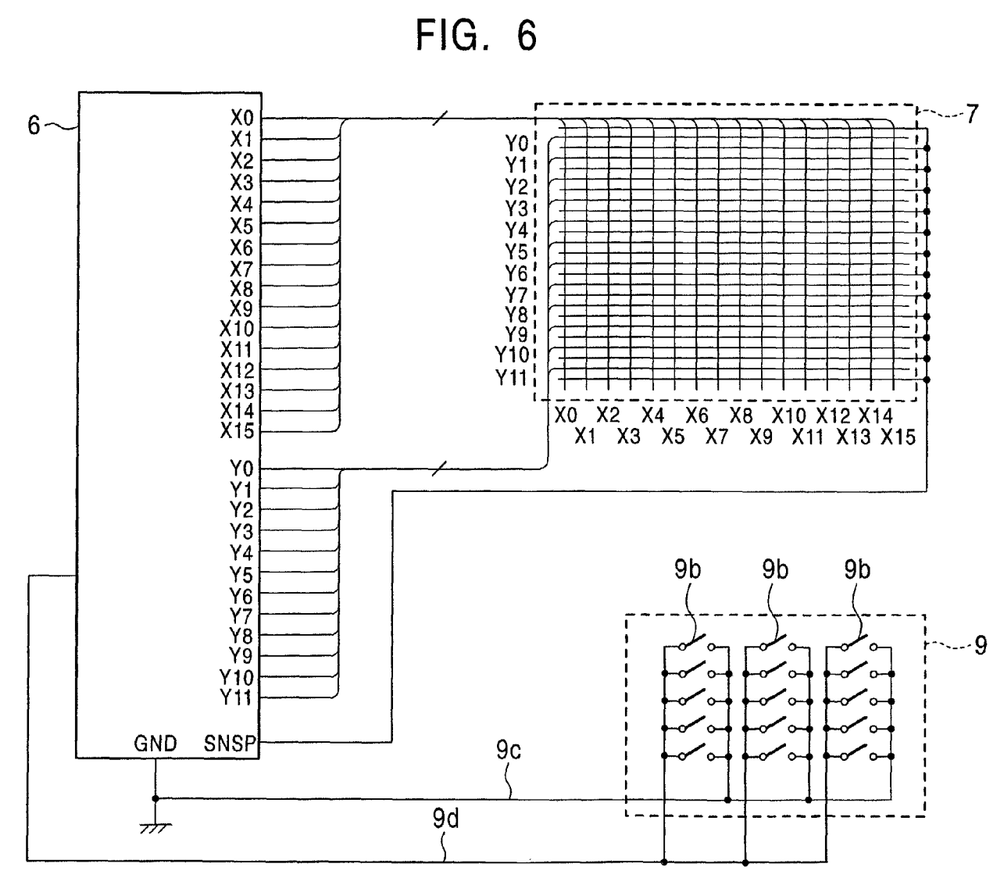
FIG. 6 is a circuit diagram of the input device according to the present invention.

FIG. 6 is a circuit diagram of the preferred embodiment of the input device 4. In the coordinate input device 7, X-direction electrodes X0 to X15 and Y-direction electrodes Y0 to Y11 are arranged in a matrix, and output lines extending from the electrodes X0 to X15 and Y0 to Y11 are connected to the control device 6.

The switch device 9 includes a plurality of switches 9b connected in parallel, and is connected to the control device 6 via two output lines 9c and 9d so that all the switches 9b output an equivalent switch signal.

Since an equivalent switch signal is input to the control device 6 by operating any of the switches 9b, the configuration of the control device 6 can be made less complicated than in devices in which the switches 9b generate different switch signals. Moreover, irrespective of whether the number of the switches 9b increases or decreases, the configuration of the control device 6 need not be changed. This can increase the versatility of the control device 6.

In the control device 6, two different modes (i.e., a first mode and a second mode) can be selected. In the first mode, the coordinate input device 7 and the switch device 9 will detect when an input portion 8b has been pressed by a finger or the like, and an item signal in accordance with the item indicated at the input portion 8b will be generated on the basis of signals generated by the coordinate input device 7 and the switch device 9. In the second mode, the coordinate input device 7 will detect when the finger or the like has slid on the operating surface 8a, and will generate a position signal indicating the position of the finger on the operating surface 8a (operating position) independently of the indication at the input portion 8b.

In the first mode, the display panel 3 displays or indicates that the input of numerals and the like is possible. In the second mode, the display panel 3 displays or indicates that a selection from the menu is possible, or that the cursor displayed thereon can be moved.

For example, in a case in which a home page (web page) on the internet is displayed on the display panel 3, a cursor is also displayed on the display panel 3, and can be freely moved in all directions on the X-Y plane by the input operation via the input device 4. After an item of the menu is selected by moving the cursor, a menu-selection determination operation is performed. The determination operation may be performed, for example, by tapping the operating surface 8a of the input device 4, or by manipulating an operating section formed in the main casing 2 separate from the input device 4. The tapping can be detected by discriminating between the load generated when the inversion plate 15 is inverted by pressing and the load generated when the inversion plate 15 is not pressed by the tapping action.

In the above-described input device 1, the first mode and the second mode are processed by software in the control device 6. As a result, the modes are automatically switched, and the display on the display panel 3 is changed, in response to the switching.

Processing by the control device 6 in the input device 4 will now be described.

Figure 7:
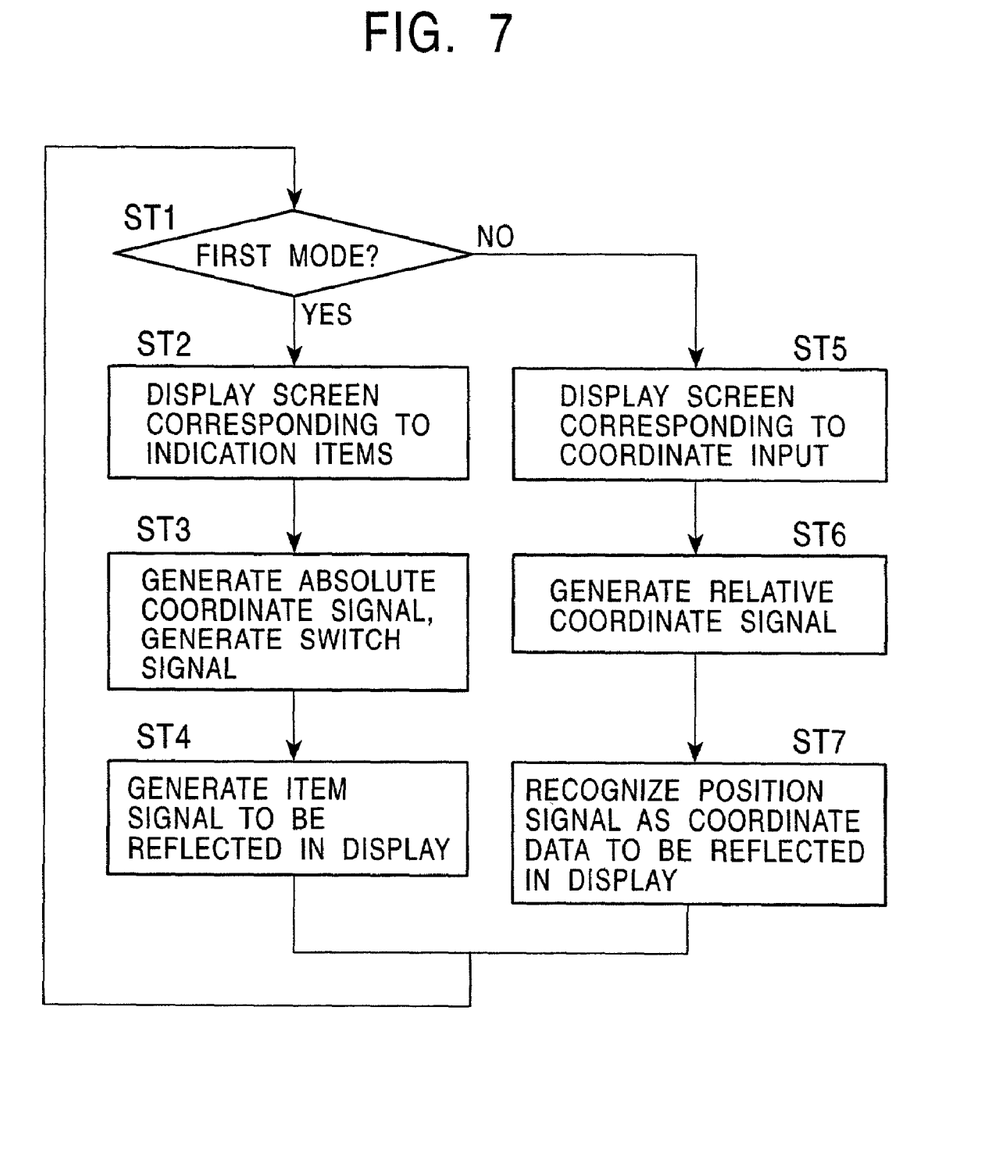
FIG. 7 is a flowchart showing the operations of the input device according to the present invention.

Referring to FIG. 7, it is first determined in Step ST1 whether or not a first mode is selected. That is, whether or not an input corresponding to indication items displayed at the input portions 8b is possible. When it is determined that the first mode is selected (YES), a screen in accordance with the indication items at the input portions 8b is displayed on the display panel 3 in Step ST2.

In Step ST3, when an input portion 8b of the input device 4 is pressed (as shown in FIG. 4), an absolute coordinate signal is generated by the coordinate input device 7, and a switch signal is generated by the switch device 9.

When a predetermined input portion 8b of a plurality of input portions 8b is pressed and the coordinate input device 7 is deformed or bent (as shown in FIG. 4), an X-direction electrode and a Y-direction electrode of the coordinate input device 7 are brought into contact with each other at the bent position (in a pressure-sensitive coordinate input type device), or the dielectric constant changes (in a capacitive coordinate input type device), and the position of the input portion 8b is detected by the coordinate input section 7a. As a result, an absolute coordinate signal is generated.

When a predetermined input portion 8b is pressed (as shown in FIG. 4), the coordinate input device 7 is deformed or bent by the pressing force, and the inversion plate 15 in the switch 9d corresponding to the input portion 8b is consequently inverted by the pressing force. As a result, a switch signal is generated.

In Step ST4, the absolute coordinate signal and the switch signal generated in Step ST3 are input to the control device 6, and an item signal is generated on the basis of these signals. The item signal is reflected or shown in the display on the display panel 3.

The item signal is generated by defining the position of the pressed input portion 8b on the basis of the absolute coordinate signal indicating the absolute position on the operating surface 8a, and by determining, on the basis of the switch signal, the presence or absence of an operation of pressing the input portion 8b.

Since the absolute coordinate signal is generated corresponding to the input portion 8b, and the switch signal is generated by the pressing force exerted on the input portion 8b, the switch device 9 is not actuated simply by touching the input portion 8b, but must be actuated by firmly pressing the input portion 8b. This prevents input error.

When it is determined in Step ST1 that a second mode is selected (NO), a screen corresponding to the input of coordinate data is displayed on the display panel 3 in Step ST5. For example, a menu screen or a cursor-moving screen may be displayed on the display panel 3.

When the operating surface 8a of the input device 4 is touched with a finger, a pen, or the like in Step ST6, a relative coordinate signal is generated by the coordinate input device 7.

When a part of the operating surface 8a is pressed and the coordinate input device 7 is deformed or bent, an X-direction electrode and a Y-direction electrode of the coordinate input device 7 are brought into contact with each other (in a pressure-sensitive coordinate input type device) at the bent position, or the dielectric constant changes (in a capacitive coordinate input type device), and the position touched with the finger or the pen is detected by the coordinate input section 7a. As a result, a relative coordinate signal is generated.

In Step ST7, the relative coordinate signal generated in Step ST6 is input to the control device 6, and a position signal is generated on the basis of the relative coordinate signal. The position signal is recognized as coordinate data, and is reflected in the display on the display panel 3.

The position signal is generated by defining the position of the finger, the pen, or the like, which has touched the operating surface 8a, on the basis of the relative coordinate signal indicating the relative position on the operating surface 8a. Therefore, the relative coordinate signal can be generated simply by touching the operating surface 8a, which enhances usability and prevents errors in the operation of the device.

In the above input device 4, a coordinate signal is generated by the coordinate input device 7, a switch signal is generated by the switch device 9, and an item signal corresponding to the input portion 8b on the operating surface 8a or a position signal corresponding to the operating position on the operating surface 8a is generated on the basis of a combination of the coordinate signal and the switch signal. This makes it possible to operate the input portion 8b and input coordinate data independently of the input portion on the same operating surface 8a, and to enhance usability.

The input device of the present invention may not only be applied to portable telephones, but also to, for example, a ten-key pad or a notebook-size personal computer in which a first mode is set for the input using a numeric keyboard and a second mode is set for the movement of the cursor.

Figure 8:
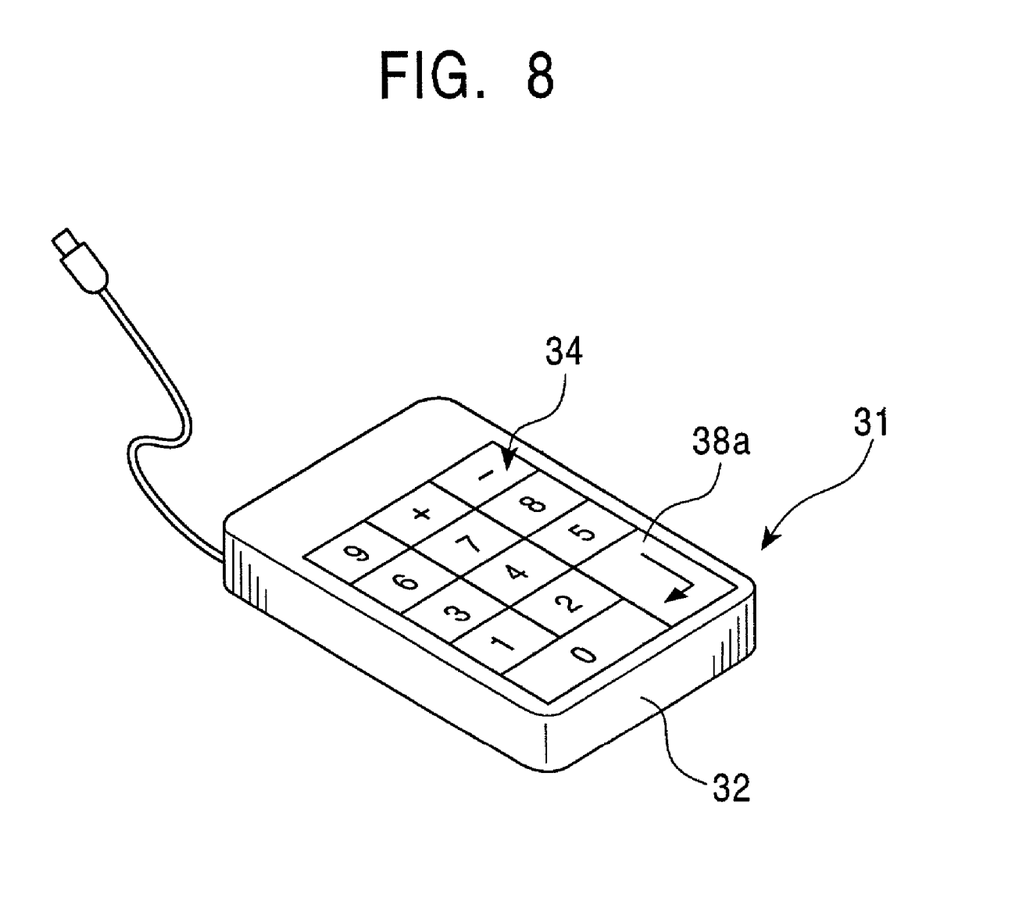
FIG. 8 is a perspective view of a ten-key pad having an input device according to another embodiment of the present invention.

FIG. 8 is a perspective view of an example of a ten-key pad having an input device of the present invention.

A ten-key pad 31 shown in FIG. 8 generally comprises a main casing 32, and an input device 34 according to the present invention that is built into the main casing 32. An operating surface 38a of the input device 34 is disposed at the top of the main casing 32.

In the ten-key pad 31, a first mode is set for the input using a numeric keyboard and a second mode is set for the movement of the cursor so that input of numerals and movement of the cursor can be performed by switching between the first mode and the second mode.

Figure 9:
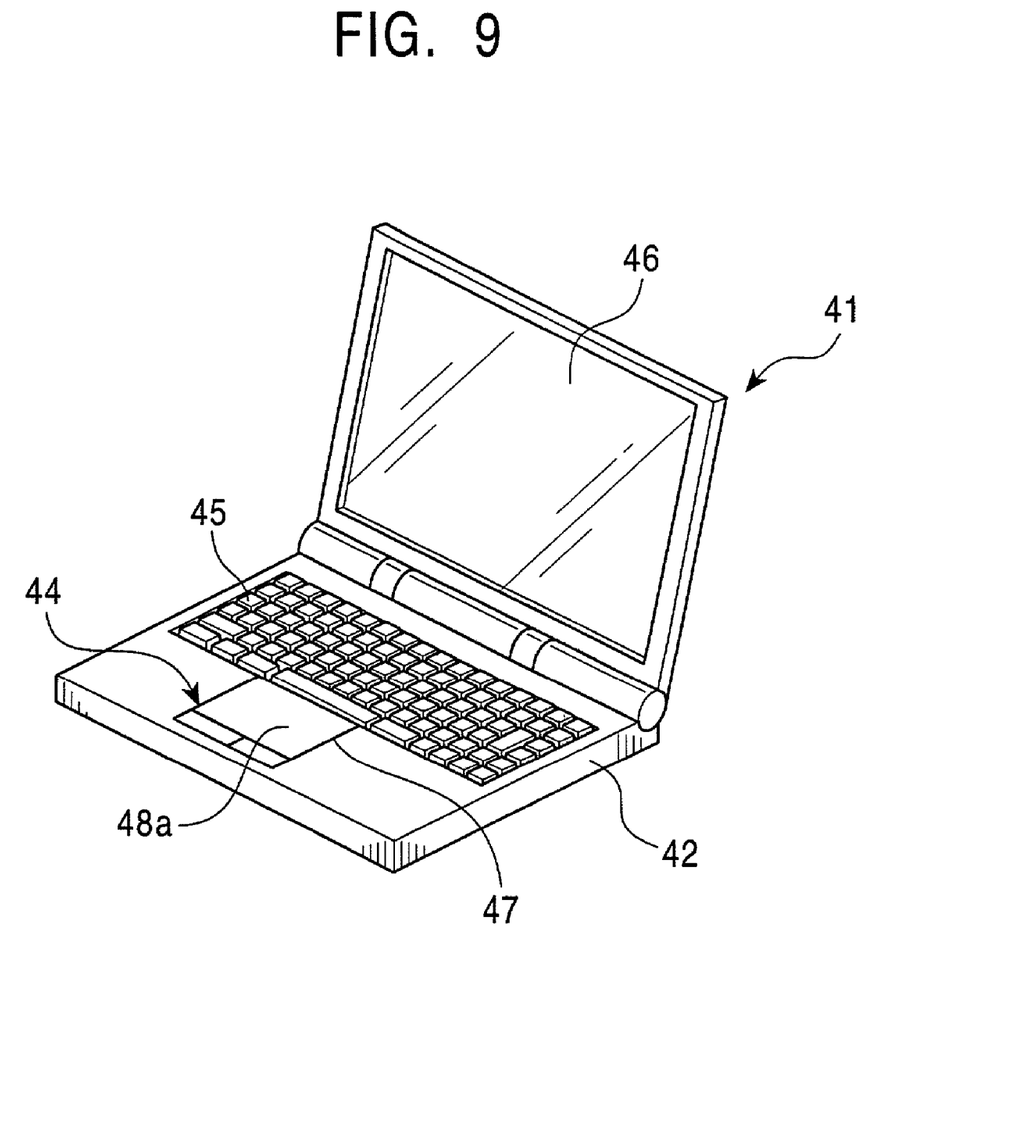
FIG. 9 is a perspective view of a notebook-size personal computer having an input device according to a further embodiment of the present invention.

FIG. 9 is a perspective view of an example of a notebook-size personal computer having an input device according to the present invention.

A notebook-size personal computer 41 shown in FIG. 9 generally comprises a main casing 42, an input device 44 according to the present invention that is built into the main casing 42, a keyboard 45, and a display device 46 such as a liquid crystal display device. An operating surface 48a of the input device 44 is disposed on the upper surface of the main casing 42, and also functions as a track pad 47 for moving the cursor.

In the notebook-size personal computer 41, a first mode is set for the input using a numeric keyboard and a second mode is set for the movement of the cursor so that input of numerals and movement of the cursor can be performed by switching between the first mode and the second mode. While a numerical keyboard is typically omitted from conventional notebook-size personal computers, the input device of the present invention allows a numerical keyboard to be placed at the track pad for moving the cursor. This enhances the usability of the notebook-size personal computer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An input device comprising:
    a main device comprising a coordinate input device, said coordinate input device having a coordinate input section;
    an operating surface disposed on a side of said coordinate input section and having a plurality of input portions displayed thereon;
    a switch device having a plurality of switches arranged on a switch surface, said coordinate input section, said operating surface, and said switch device being disposed in a stacked arrangement with the positions of said switches corresponding to the positions of said input portions; and
    a control device configured to receive and process an item signal, generated in a first mode based on an absolute coordinate signal output from said coordinate input device in conjunction with a single switch signal output caused by activation of any of said plurality of switches; and
    the control device configured to receive and process a position signal generated in a second mode based solely on the absolute coordinate signal output from said coordinate input device and independent of said plurality of switches.

2. An input device according to claim 1, wherein the control device receives a single switch signal output indicating that any one of said switches is activated.

3. An input device according to claim 1, wherein the absolute coordinate signal is generated when said coordinate input section detects the position of an operated input portion of said input portions, and the switch signal is generated when a switch corresponding to said input portion is operated by the force of pressing said input portion in the first mode.

4. An input device according to claim 1, wherein the coordinate signal is generated in the second mode when said coordinate input section detects an operating position on said operating surface.

5. An input device comprising:
    a main device comprising a coordinate input device, said coordinate input device having a coordinate input section, an operating surface disposed on a side of said coordinate input section and having a plurality of input portions displayed thereon, and a switch device having a plurality of switches arranged on a switch surface, said operating surface and said switch device being disposed such that the positions of said switches correspond to the positions of said input portions; and
    a control device which receives and processes signals in a first mode in which an item signal is generated in accordance with an indication item at an input portion when said input portion is operated and on the basis of an absolute coordinate signal output from said coordinate input device in conjunction with a single switch signal output from said plurality of switches, and a second mode in which a coordinate signal is generated when an operating position on said operating surface is touched and independently of the plurality of switches, wherein said operating position is located on an operating surface of said input portions and around said input portions.

6. An input device comprising:
    a main device comprising a coordinate input device, said coordinate input device having a coordinate input section, an operating surface disposed on a side of said coordinate input section and having a plurality of input portions displayed thereon, and a switch device having a plurality of switches arranged on a switch surface, said operating surface and said switch device being disposed such that the positions of said switches correspond to the positions of said input portions; and
    a control device which receives and processes signals in a first mode in which an item signal is generated in accordance with an indication item at an input portion when said input portion is operated and on the basis of an absolute coordinate signal output from said coordinate input device in conjunction with a single switch signal output from said plurality of switches, and a second mode in which a coordinate signal is generated when a corresponding operating position on said operating surface is touched and independently of the plurality of switches, wherein the coordinate signal controls a cursor on a display, the cursor being movable in all directions of a plane of the display, and wherein the plurality of switches are operable to generate a single signal received by the control device.

7. An input device comprising:

a main device having a coordinate input device having a coordinate input section;

an operating surface disposed on a side of the coordinate input section and having a plurality of input portions displayed thereon;

a plurality of switches arranged on a switch surface, wherein the coordinate input section, the operating surface, and the switch surface are disposed in a stacked arrangement, and wherein positions of the plurality of switches correspond to the positions of the input portions; and a control device that is operable to receive and process signals in a first mode that comprises an item signal generated by an operation of the coordinate input device, which outputs an absolute coordinate signal in conjunction with least one of the plurality of switches, which outputs a single switch signal, wherein the control device is operable to simultaneously receive and process the absolute coordinate signal and the single switch signal, and wherein the control device is also operable to receive and process signals in a second mode that comprises a position signal that is generated solely on the basis of a coordinate signal output from said coordinate input device and is generated independently of the switch surface.

* * * * *

UNITED STATES PATENT AND TRADEMARK OFFICE
CERTIFICATE OF CORRECTION

| | | |
|---|---|---|
| PATENT NO. | : 7,339,577 B2 | Page 1 of 1 |
| APPLICATION NO. | : 10/157335 | |
| DATED | : March 4, 2008 | |
| INVENTOR(S) | : Tadamitsu Sato et al. | |

It is certified that error appears in the above-identified patent and that said Letters Patent is hereby corrected as shown below:

In the Claims

In column 10, claim 7, line 7, after "conjunction with" insert --at--.

Signed and Sealed this

Fourteenth Day of September, 2010

David J. Kappos
*Director of the United States Patent and Trademark Office*